Oct. 30, 1951  E. G. GREEN  2,573,009
THREAD LOCK
Filed Oct. 28, 1947
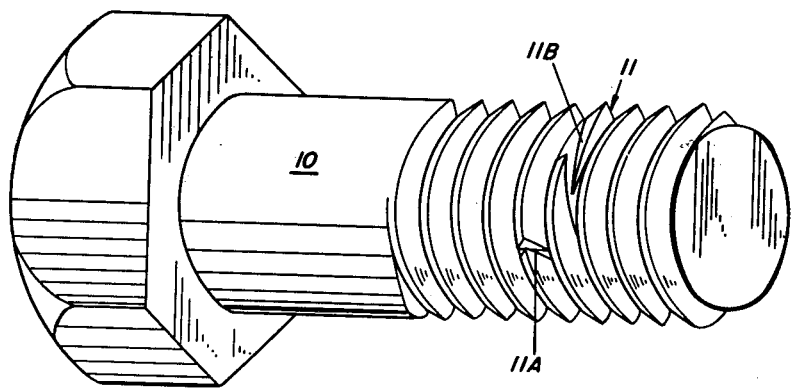
FIG_1
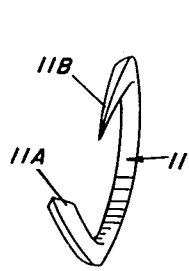
FIG_4
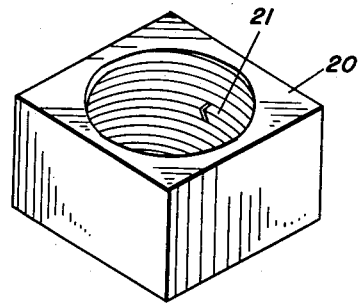
FIG_5
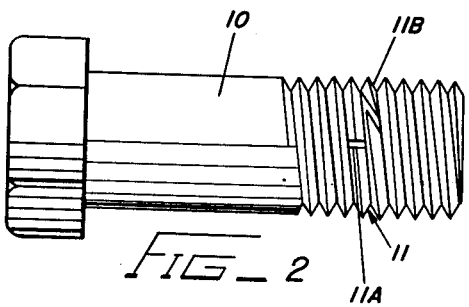
FIG_2
FIG_3
INVENTOR.
ELLIS G. GREEN
BY Hauke, Hardesty, + Schmidt
ATTORNEYS.

Patented Oct. 30, 1951

2,573,009

UNITED STATES PATENT OFFICE 2,573,009

THREAD LOCK

Ellis G. Green, Port Huron, Mich., assignor to himself and Nellie C. Green, Port Huron, Mich., jointly Application October 28, 1947, Serial No. 782,607

1 Claim. (Cl. 151—22)

The present invention relates to means for locking threaded members and has among its objects the provision of means carried by one of a bolt-nut combination to prevent accidental separation of these members.

Another object of the invention is to provide a bolt or nut with a floating thread portion adapted to allow threading on of the other member but adapted to move a short distance and "jam" the threads when the two members are operated in a threading off movement.

Still other objects and advantages will be apparent to those skilled in the art upon reference to the following description and the accompanying drawings in which Fig. 1 is a perspective view of a bolt or machine screw involving the invention.

Fig. 2 is a side elevation of a similar bolt.

Fig. 3 is a sectional view of a standard nut.

Fig. 4 is a perspective view of the floating thread element.

Fig. 5 is a perspective view of a nut involving the invention and adapted to be used with a standard bolt.

As indicated in the drawing, the bolt or screw 10 has a portion of its thread omitted or cut away, and a curved resilient floating thread member 11, such as shown in Fig. 4, is loosely seated on the bolt in the place of said omitted or cut-away thread section. Such section should extend through an arc of at least slightly more than 180°, and preferably not more than 360°; for example, an arc of approximately 270° is shown in the drawing. The arcuate length of the floating thread member 11 should be somewhat less than that of the missing thread section of the bolt, whereby frictional engagement of the floating member 11 with the threads of the standard nut shown in Fig. 3 as the latter is threaded onto the bolt, may produce limited rotative movement of the floating member on the bolt.

One end of the member 11 is formed with an abrupt end face 11A extending straight across it and lying substantially in a plane including the longitudinal axis of the member, while the other end portion of said member is tapered or beveled to provide an angularly disposed camming or wedging surface 11B on one of its lateral faces, which surface lies in a plane including a line perpendicular to and passing through said member axis, and which plane makes a substantial angle with said axis. The ends of the bolt thread adjoining its omitted or cut-away section are provided with surfaces respectively complementing the abrupt end face 11A and the beveled camming surface 11B of the floating member, whereby circumferential movement of such member on the bolt under the influence of the nut as it is threaded onto the latter will jam the abrupt end face 11A against its companion face on the bolt thread while relieving engagement between the beveled face 11B of the floating member and its companion beveled face on the bolt thread, thus permitting the nut to be freely run up to its desired position. On the other hand, reverse rotation of the nut on the bolt will shift the floating thread member 11 to bring its beveled surface 11B into engagement with the complementary beveled camming surface of the bolt thread, and the wedging action of these two surfaces produces an axial deflection of the end portion of the floating member which locks the nut against further rotation in such direction.

It is preferred to make the floating thread member 11 with a radius of curvature slightly greater than that of the fixed bolt thread, to insure adequate frictional engagement of the said member with the nut threads to produce the arcuate shifting of the floating member on the bolt.

In the case of the nut 20, an exactly similar floating thread member 21 is used, the differences being the obvious ones, viz., it is of course a female thread and the circumferential length may be less. Further, the radius of curvature should be slightly less than that of the fixed thread.

In the operation when the bolt of Figs. 1 and 2 is screwed into a standard nut or other threaded female member, the floating member acts as a normal thread, being carried along by the abrupt end 11A abutting the fixed thread. When, however, reverse movement takes place, the wedge end 11B jams between the threads in the nut and prevents turning, only a slight reverse movement being required to accomplish the locking.

The amount of reverse movement required for locking will depend upon the angle of the wedge end 11B and upon the difference in length between the floating member 11 and the length of the missing thread space. A sharp angle for end 11B and considerable endwise movement of member 11 will, of course, require a greater reverse movement to lock, while a larger angle and shorter endwise movement will cause locking with only a degree or two of reverse movement.

When the invention is applied to a nut to be used with a standard bolt, the same action and considerations will be noted.

Now having described the invention and the preferred embodiment thereof, it is to be understood that said invention is to be limited not to the specific details herein set forth but only by the scope of the claim which follows.

I claim:

A threaded element for interlocking engagement with a standard mating threaded member to prevent unintentional separation of the two, said element having a section of its thread omitted through an arc of at least slightly more than 180°, the thread of said element at one end of said omitted section being formed to provide an abrupt surface extending substantially in a plane including the longitudinal axis of said element, and the thread at the other end of said omitted section being formed to provide a camming surface lying substantially in a plane including a line perpendicular to and passing through said axis, said plane being at an acute angle to said axis; and a curved floating thread member of slightly less arcuate length than said omitted thread section of the element, loosely seated in the space provided by said omitted section and arcuately movable therein through frictional engagement of the floating member with said mating threaded member, the respective ends of said floating member being formed to complement the above-mentioned element thread formations at the ends of the omitted section, whereby upon slight relative rotation between the threaded element and its mating threaded member in one direction, wedging coaction between the complementary camming surfaces of the element thread and the floating thread member produces an axial deflection of a portion of the latter which prevents further relative rotation between and separation of the threaded element and its mating member.

ELLIS G. GREEN.

REFERENCES CITED

The following references are of record in the file of this patent:

UNITED STATES PATENTS

| Number | Name | Date |
|--------|------|------|
| 764,591 | Hughes | July 12, 1904 |
| 1,957,095 | Cole | May 1, 1934 |
| 2,367,213 | Harding | Jan. 16, 1945 |